United States Patent [19]
Nishijima et al.

[11] Patent Number: 5,474,100
[45] Date of Patent: Dec. 12, 1995

[54] ELECTRICITY/AIR PRESSURE CONVERTER

[75] Inventors: Takashi Nishijima; Atsushi Kimura; Yasuo Kasahara; Masahito Tsuchiya, all of Tokyo, Japan

[73] Assignee: Yokogawa Electric Corporation, Tokyo, Japan

[21] Appl. No.: 302,125

[22] Filed: Sep. 7, 1994

[30] Foreign Application Priority Data

Oct. 15, 1993 [JP] Japan .................................. 5-257419

[51] Int. Cl.$^6$ ........................... G05B 11/50; F16K 31/08
[52] U.S. Cl. ............................. 137/82; 137/544; 251/65; 251/129.16; 251/129.21
[58] Field of Search ..................... 137/82, 544; 251/65, 251/129.16, 129.21

[56] References Cited

U.S. PATENT DOCUMENTS

| | | | |
|---|---|---|---|
| 2,947,284 | 8/1960 | Nicholson | 137/82 X |
| 3,645,293 | 2/1972 | Pedersen | 137/82 X |
| 3,799,498 | 3/1974 | Wickham et al. | 137/82 X |
| 3,817,488 | 6/1974 | Mack | 137/625.64 X |
| 4,196,751 | 4/1980 | Fischer et al. | 251/129.16 X |
| 4,579,137 | 4/1986 | Brandt | 137/82 X |

FOREIGN PATENT DOCUMENTS

| | | | |
|---|---|---|---|
| 3-219177 | 9/1991 | Japan | 251/129.16 |
| 2124342 | 2/1984 | United Kingdom | 251/129.16 |

*Primary Examiner*—Gerald A. Michalsky
*Attorney, Agent, or Firm*—Moonray Kojima

[57] ABSTRACT

An electricity/air pressure converter comprising a pair of housings, made of a soft magnetic material, in the middle of which pole pieces are disposed facing each other with an air gap therebetween and which have a cylindrically formed outer circumferential portion; a permanent magnet secured to one of the housings at one end thereof and surrounding one of the pole pieces; a movable member, made of a magnetic material and having spring properties, which is secured to the other end of the permanent magnet and which faces the pole pieces in the air gap; a coil which is wound around the other housing so that it surrounds the pole pieces and through which a current signal flows; and a nozzle which is disposed to face the movable member around the center of either of the pole pieces and which is in communication with one end of a restrictor which is supplied with a supply air pressure at the other end thereof, wherein back pressure is generated at the nozzle according to current signals being outputted as an air pressure signal. Advantageously, the configuration of the invention is compact, and is easily manufactured at low cost, and is highly reliable and stable.

11 Claims, 8 Drawing Sheets

ELECTRICITY/AIR PRESSURE CONVERTER

BACKGROUND OF THE INVENTION

1. Field of Invention

This invention relates to an electricity to air pressure converter for converting an electrical signal into an air pressure corresponding thereto; and, more particularly, to such a converter having improved stability, compactness and is inexpensive.

2. Description of the Prior Art

Figure 1A:
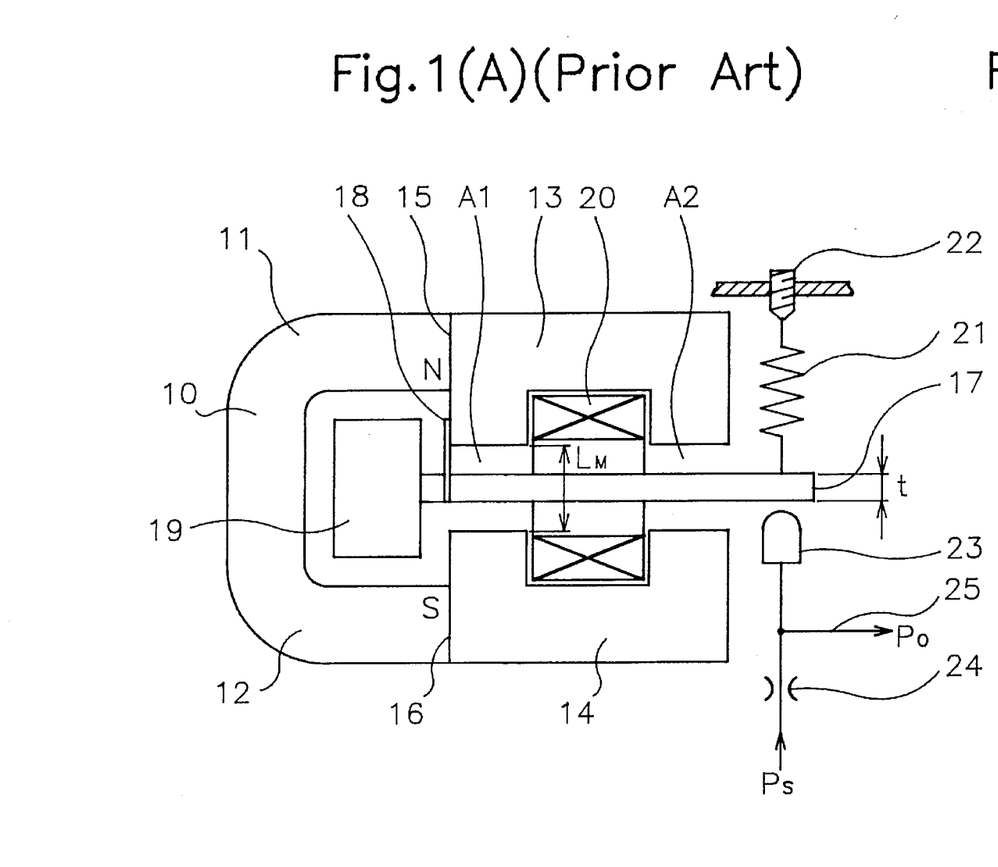
FIGS. 1(A) and 1(B) are sectional views depicting a conventional electricity/air pressure converter.
Figure 1B:
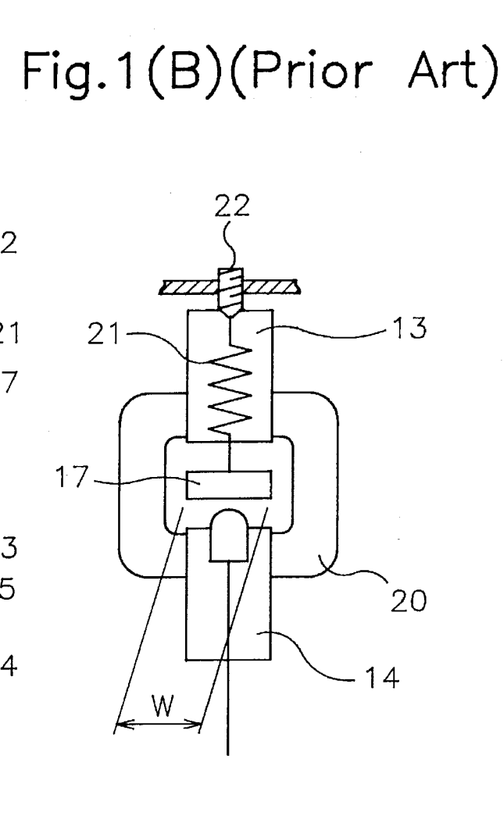

FIGS. 1(A) and 1(B) show a conventional electricity/air pressure converter, such as disclosed, for example, in Japan Unexamined Patent No. 4-73,401; wherein FIG. 1(A) is a longitudinal sectional view and FIG. 1(B) is a right side view. A U-shaped permanent magnet 10 is shown comprising an upper leg portion 11, which is an N-pole, and a lower leg portion 12, which is a S-pole. Sides 15 and 16, of a pair of U-shaped yokes 13 and 14, made of a soft magnetic material, are secured to leg portions 11 and 12, respectively, with a constant space $L_M$ maintained therebetween. Accordingly, the leg portions of yokes 13 and 14 define spaces $A_1$ and $A_2$, which are equal to each other.

A movable piece 17, made of a soft magnetic material, extends through spaces $A_1$ and $A_2$ in the middle thereof. Movable piece 17 is secured to side 15 of yoke 13, in the vicinity of one end thereof, by a spring member 18, made of a non-magnetic material, such as beryllium copper, to be rotatable about this point. Movable piece 17 is configured to be asymmetric about the center thereof and is dynamically off balance. Thus, a counter weight 19 is secured to one end of yoke 13. A coil 20 is disposed in an internal space defined by the pair of U-shaped yokes 13 and 14 facing each other so that coil 20 surrounds movable piece 17 with a space maintained therebetween.

One side of the other end of movable piece 17 is secured by a securing pin 22, through a spring member 21, and a nozzle 23 is disposed to face the other side of this end of movable piece 17 with a small gap therebetween.

Nozzle 23 is supplied with a supply air pressure $P_s$ through a restrictor 24, and an output air pressure $P_o$ is obtained as a back pressure of nozzle 23 between restrictor 24 and nozzle 23 through a conduit 25.

The operation of the just described converter will now be discussed with reference to FIG. 2. In space $A_1$, an air gap length $L_{g11}$ is formed between one leg portion of yoke 13 and movable piece 17; and an air gap length $L_{g12}$ is formed between one leg portion of yoke 14 and movable piece 17. In space $A_2$, an air gap length $L_{g21}$ is formed between the other leg portion of yoke 13 and movable piece 17; and an air gap length $L_{g22}$ is formed between the other leg portion of yoke 14 and movable piece 17.

In each of the air gaps $A_{g11}$, $A_{g12}$, $A_{g21}$, and $A_{g22}$, defined by air gap lengths $L_{g11}$, $L_{g12}$, $L_{g21}$, and $L_{g22}$, there exists magnetic flux $\phi_E$ which is generated by magnetic flux $\phi_d$, generated by permanent magnet 10, and an input current I flowing through coil 20.

Magnetic flux $\phi_d$ flows from the N-pole of permanent magnet 10 to the S-pole thereof through each of air gaps $A_{g11}$, $A_{g12}$, $A_{g21}$, and $A_{g22}$, while magnetic flux $\phi_E$ is the sum of, for example, magnetic flux flowing through air gaps $A_{g11}$ and $A_{g12}$ and movable piece 17 and magnetic flux flowing through air gaps $A_{g21}$ and $A_{g22}$ and movable piece 17, as indicated by the arrow.

Thus, if the input current I is zero, the magnetic fields formed in air gaps $A_{g21}$ and $A_{g22}$ are equal in strength because the fields have only magnetic flux $\phi_d$ generated by permanent magnet 10. Since a magnetic attracting force in an air gap is proportional to the square of the strength of the magnetic field, the movable piece 17 is disposed in the middle of space $L_M$.

On the other hand, since movable piece 17 is secured at a point in the vicinity of one end thereof by spring member 18, movable piece 17 moves about this point, which serves as a support point. Thus, as input current I flows through coil 20, magnetic flux $\phi_E$ generated by input current I, is added to magnetic flux $\phi_d$ ($\phi_d+\phi_E$) in air gap $A_{g21}$ while it is subtracted from magnetic flux $\phi_d$ ($\phi_d-\phi_E$) in air gap $A_{g22}$. As a result, an upward force $F_2$ acts on movable piece 17 in the air gap, as depicted.

Since air gap $A_{g11}$ has magnetic flux ($\phi_d-\phi_E$) and air gap $A_{g12}$ has magnetic flux ($\phi_d+\phi_E$), a downward force $F_1$ acts on movable piece 17 in the air gap, which is closer to the support point, as depicted.

Since the lengths of air gaps $L_{g11}$, $L_{g12}$, $L_{g21}$, and $L_{g22}$, are equal, forces $F_1$ and $F_2$ are equal in magnitude and opposite each other in direction. The force in each air gap is proportional to the square of the magnetic flux therein. Thus, the following equation is derived:

$$F_1 = F_2 \alpha (\phi_d+\phi_E)^2 - (\phi_d-\phi_E)^2 \tag{1}$$

The forces generated can be expressed as follows:

$$F_1 = F_2 = K_M \phi_d \phi_E \tag{2}$$

wherein $K_M$ represents a proportion constant.

Although movable piece 17 is slightly displaced when input current I flows, the displacement is ignored because it is normally on the order of 5 to 50 μm and $L_g$ is normally on the order of 1 to 2 mm.

As a result, rotational torque T, as given by below equation 3, is generated on movable piece 17, counterclockwise, about spring member 18 to move movable piece 17 toward yoke 13.

$$T = F_2 \cdot L_2 - F_1 \cdot L_1 = F(L_2 - L_1) = F \cdot L \tag{3}$$

wherein $F = F_1 = F_2$ and $L = L_2 - L_1$.

As movable piece 17 moves toward yoke 13, the space between nozzle 23 and movable piece 17 expands, thereby reducing the back pressure of the nozzle, and consequently, reducing output air pressure $P_o$. Thus, an output air pressure $P_o$, corresponding to the input current I, is obtained.

However, the described conventional converter has various problems, such as listed below.

1. One problem is that torque T which is generated, is expressed by the following equation:

$$T = K_M \cdot \phi_E \cdot \phi_d \cdot L \tag{4}$$

Furthermore, magnetic flux $\phi_E$ generated by coil 20 can be expressed as follows:

$$\begin{aligned}\phi_E &= N \cdot I/(RL_g + R_{yo} + R_m) \\ &= (N \cdot I/RL_g)/[1 + (R_{yo} + R_m)/RL_g]\end{aligned} \tag{5}$$

wherein $RL_g$ represents the magnetic resistance of the air gap; $R_{yo}$ represents the magnetic resistance of yoke 13; $R_m$ represents the magnetic resistance of movable piece 17; and N represents the number of turns of coil 20.

N and $RL_g$ are constant while the magnetic resistance $R_m$ of movable piece 17 and magnetic resistance $R_{yo}$ of yoke 13 includes some error relative to the input current I because of the non-linearity and hysteresis properties of the soft magnetic materials used in the components.

Figure 2:
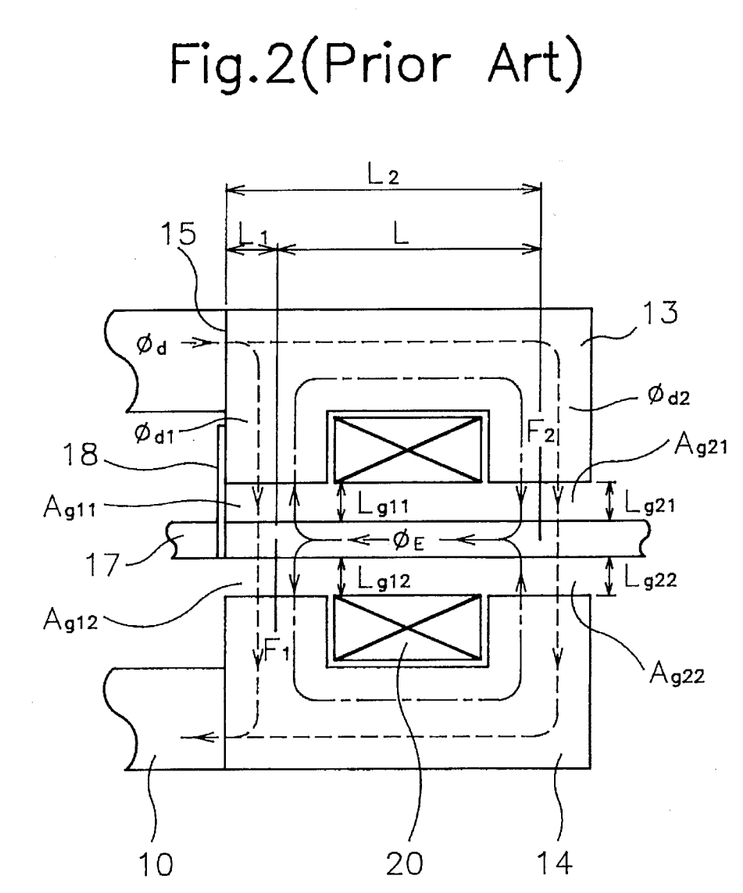
FIG. 2 is a view useful in describing the operation of the converter of FIGS. 1(A) and 1(B).

Since magnetic flux $\phi_E$, generated by coil 20, flows through movable piece 17 in the direction indicated by the dashed line in FIG. 2, i.e. in a direction parallel to the central axis of coil 20, the magnetic resistance $R_m$ of movable piece 17 is increased as the sectional area S (=t·w) of movable piece 17, in a direction perpendicular to the direction of the flow, is decreased.

As a result, the ratio of magnetic resistance $R_m$ to magnetic flux $\phi_E$ is increased, as is apparent from above equation (5). This increases the influence of non-linearity and hysteresis of movable piece 17, which is made of a soft magnetic material, thereby increas-in the error in the generated torque relative to the input current I.

If the sectional area S is decreased below a predetermined value, magnetic flux density $B_E=\phi_E/S$ approaches the saturation magnetic flux density of the soft magnetic material. As a result, the linear relationship between the input current I and the output torque T is completely lost.

Furthermore, if width w of movable piece 17 is decreased, magnetic resistance $RL_g$ is increased at each of the air gaps. If the magnetomotive forces of coil 20 and permanent magnet 10 are equal, this results in decreases in $\phi_E$ and $\phi_d$, thereby reducing conversion efficiency (i.e. generated toque divided by input current). Accordingly, vulnerability to disturbances is increased and stability is reduced.

Accordingly, the sectional area S of movable piece 17 cannot be decreased below a predetermined amount, and it is thus difficult to reduce the mass of the parts below a predetermined amount. Thus, the particular part discussed cannot be reduced in overall size. Also, there is poor anti-vibration and anti-shock properties.

In addition, since the resonance frequency cannot be increased beyond a predetermined value, and a movable portion having a large inertia is controlled by a force smaller than a predetermined value, the part has poor controllability and is difficult to operate in a stable manner.

2. Another problem is that many magnetic paths, through which leakage flux flows,/which are formed around each of the air gaps and at the sides of yokes 13 and 14, other than at the air gaps, and the converter, are not entirely covered by a magnetic material. Thus, the output of the converter can be adversely affected by any external magnetic material placed in the vicinity thereof, or by any magnetic field which exists externally of the converter.

To cover the entire converter with a magnetic material in order to magnetically shield the converter and thus reduce such aforementioned effect, the magnetic material must be spaced sufficiently away from the converter so that it does not affect the magnetic flux at the air gaps. This would increase the overall size of the converter and the number of components, thereby making it difficult to provide a converter which is compact in size, inexpensive, and stable in operation against magnetic disturbances.

3. A further problem is that movable piece 17 is secured to yoke 13 through spring member 18 and rotates about such support point. Spring member 21 and securing pin 22 are provided on the other end of movable piece 17 in order to maintain the overall spring constant above a predetermined value and to adjust the position of movable piece 17 relative to the pair of yokes 13 and 14.

It is necessary to fabricate movable piece 17 and yokes 13 and 14 using soft magnetic material, and spring memebers 18 and 21 using non-magnetic materials, such as beryllium copper or materials which have some magnetism but with low magnetic permeability and a small coercive force, such as spring type materials of an austenited stainless steel.

Securing points, wherein materials of different types are secured together, are required between spring member 18 and movable piece 17, between spring member 18 and yokes 13 and 14, and between movable piece 17 and spring member 21. Any positional shift in such points can significantly and adversely affect the stability of the output because such a shift produces disturbance torque directly to movable piece 17 and the direction of the shift coincides with the direction in which nozzle 23 is displaced.

Although it is desirable to use a reliable method, such as welding, to secure such parts, screwing or soldering is generally used because different types of materials are secured together, and that any thermal effect which can deteriorate spring properties and magnetic properties, must be avoided. However, since different types of materials having different thermal expansion coefficients are involved, it is difficult to maintain high stability because positional shifts can be easily caused by temperature changes.

4. A still further problem is that since the pair of yokes 13 and 14, movable piece 17, and spring members 18 and 21, are separate components, it is difficult to accurately position these parts. It is important to achieve positional accuracy in the vertical direction, that is distances $L_{g11}$, $L_{g12}$, $L_{g21}$, and $L_{g22}$ between yokes 13 and 14 and movable piece 17 should be equal.

However, yokes 13 and 14 are disposed with a space therebeween in which movable piece 17 is rotatably interposed using spring members 18 and 19, serving as support points. It is thus difficult to define the positional relationship between the components based only on the accuracy achieved during processing. This results in an increase in the time required for assembly of the components, and consequently, cost of manufacture is increased.

5. Another problem is that since movable piece 17 cannot be reduced in size below a predetermined amount, and since piece 17 rotates about a support point, a counter weight 19 must be provided to balance the two ends thereof about the support point. This increases the overall size of the device, thus making it difficult to fabricate the device at a low cost.

This problem exists also in the commonly used force balance type of electricity to air pressure converter, wherein an input current of 4 to 20 mA is directly inputted to the coil, or an electricity to air pressure converter of an electropneumatic positioner.

Figure 3:
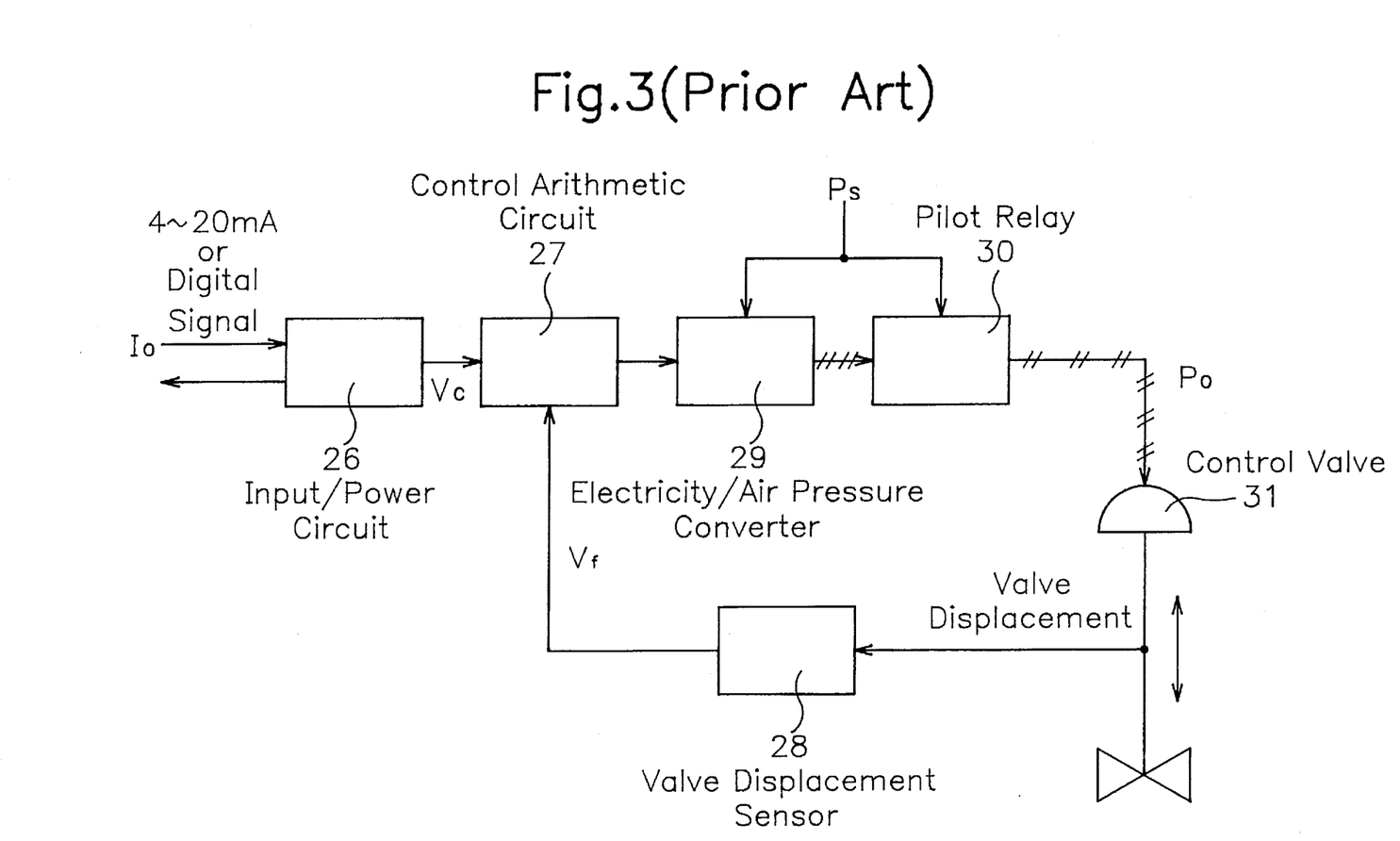
FIG. 3 is a block diagram depicting a system wherein the converter of FIGS. 1(A) and 1(B) is used as a part of an electropneumatic positioner.

Taking the electropneumatic positioner, and utilizing an electricity to air pressure converter as described above as a component, as an example, the problem is compounded in the conventional device of FIG. 3.

In FIG. 3, a current signal $I_o$ of 4 to 20 mA or a digital signal, such as a field bus, is inputted to an input/power circuit 26, which provides a circuit power supply using current signal $I_o$ and which provides a control voltage $V_c$, which is proportional to current signal $I_o$, and outputs the voltage $V_c$ to a control arithmetic circuit 27.

Control arithmetic circuit 27 receives control voltage $V_c$ and a feedback signal $V_f$ outputted by valve displacement sensor 28, comprising a potentiometer or the like, and generates a signal which represents the difference between the two signals which is then outputted to an electricity/air pressure converter 29.

A supply air pressure $P_s$ is supplied to electricity/air pressure converter 29, which may be the converter shown in FIGS. 1(A) and 1(B), and as a nozzle back pressure, supply air pressure $P_s$ is supplied to and amplified by a pilot relay 30 and is outputted to control valve 31 as an air pressure signal $P_o$.

Control valve 31 is driven according to the air pressure signal $P_o$, and the displacement of the stem, which defines the opening of the valve, is detected as the displacement of the valve, by valve displacement sensor 28, and is fed back,as negative feedback, to control arithmetic circuit 27, as feedback signal $V_f$.

Thus, control arithmetic circuit 27 performs a control function so that the control voltage $V_c$ and feedback signal $V_f$ agree with each other,thereby producing a valve opening which is proportional to the current signal $I_o$.

The feedback signal $V_f$ is fed back as an electrical signal, and current is consumed also by control arithmetic circuit 27, and valve displacement sensor 28 and the like. Thus, there is a limit to the amount of current that can be distributed to the converter 29.

As a result, the FIG. 3 device has a problem of abnormality in output caused by fluctuations due to disturbances which cannot be corrected, especially when the input current is small, such as about 4 mA.

Thus, it can be appreciated that the prior art leaves room for improvement.

SUMMARY OF THE INVENTION

Accordingly, an object of the invention is to overcome the aforementioned and other deficiencies and disadvantages of the prior art.

Another object is to provide an electricity/air pressure converter which is less vulnerable to the influences of non-linearity and hysteresis.

A further object is to provide a stable electricity/air pressure converter, which excels in anti-vibration, anti-shock and control propertiess, by raising the resonance point through a reduction in mass.

A still further object is to provide an electricity/air pressure converter which is compact, inexpensive, and which is stable against magnetic disturbances.

A yet further object is to provide an electricity/air pressure converter which has low power consumption.

The foregoing and other objects are attained by the invention which encompasses an electricity to air pressure converter comprising a pair of housings, made of a soft magnetic material, in the middle of pole pieces disposed to face each other with an air gap therebetween and which have a cylindrically formed outer circumferential portion; a permanent magnet secured to one of the housings at one end thereof so that the magnet surrounds one of the pole pieces; a movable member made of a magnetic material and having spring properties, which is secured to the other end of the permanent magnet and which is disposed so that the movable member faces the pole pieces in the air gap; a coil which is wound about the other housing so that the coil surrounds the pole pieces and through which a current signal flows; and a nozzle which is disposed to face the movable member around the center of either of the pole pieces and which is in communication with one end of a restrictor which is supplied with a supply air pressure at the other end thereof, a nozzle back pressure being generated at the nozzle according to a current signal being outputted as an air pressure signal.

DETAILED DESCRIPTION OF THE PREFERRED EMBODIMENTS

Figure 4:
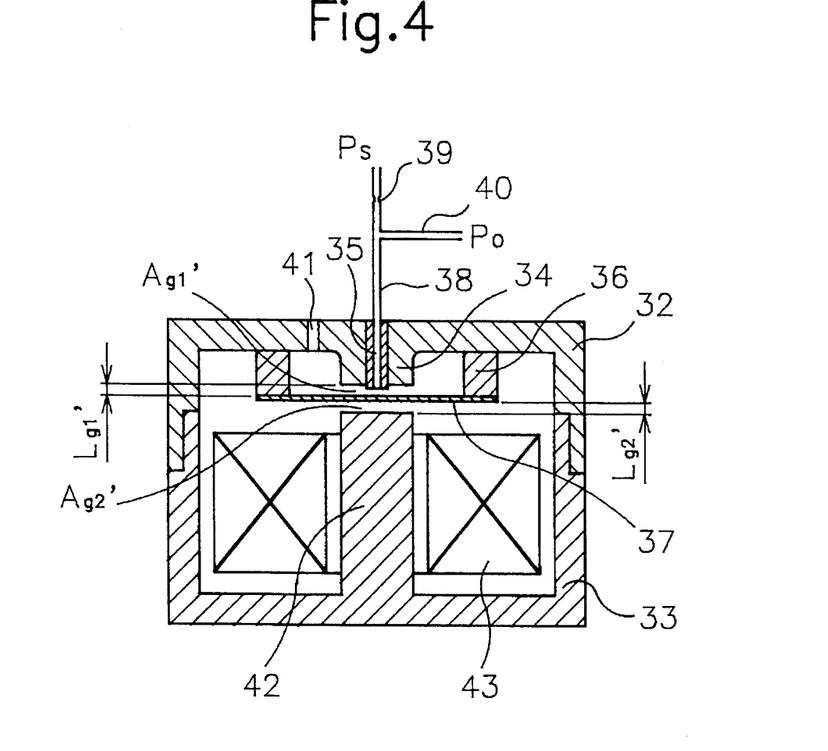
FIG. 4 is a longitudinal sectional view depicting a first illustrative embodiment of the invention.

Turning now to FIG. 4, there is depicted an upper housing 32 and a lower housing 33, both of which are made of soft magnetic material, such as pure iron, ferrite type stainless steel, and permalloy. Housing 32 bas an outer diameter portion in the shape of a cylinder and a cylindrical pole piece 34, made of a soft magnetic material, which is formed at the center thereof extending inwardly. A nozzle 35, extending through pole piece 34 from the outside to the inside, is formed at the center, as shown.

A donut shaped permanent magnet 36 is formed on an inner surface of housing 32 surrounding pole piece 34. Permanent magnet 36 is magnetized in the axial direction so that, for example, the side which is secured to housing 32 serves as the N-pole and the opposite side serves as the S-pole. It is usually of hard magnetic material.

A samarium-cobalt magnet, iron-neodymium magnet, or the like, having a large energy product, is preferably used as permanent magnet 36 because the length, in the direction of magnetization need not be very long for such a magnet.

A diaphragm shaped movable member 37 is secured to the side of permanent magnet 36 opposite to the side where it is secured to housing 32 by means of, for example, the attracting force of permanent magnet 36, with a predetermined gap length $L_{g1}'$ to the pole piece 34 maintained therebetween. This member is deflected up and down by an external force.

Movable member 37 is made of a magnetic spring material, such as precipitation hardened stainless steel, iron-nickel alloy, and iron-chromium-cobalt alloy, which has both spring properties and magnetic properties, including a high saturation magnetic flux density and is magnetized to have only one polarity, i.e. magnetized as either S-pole or N-pole.

Figure 5:
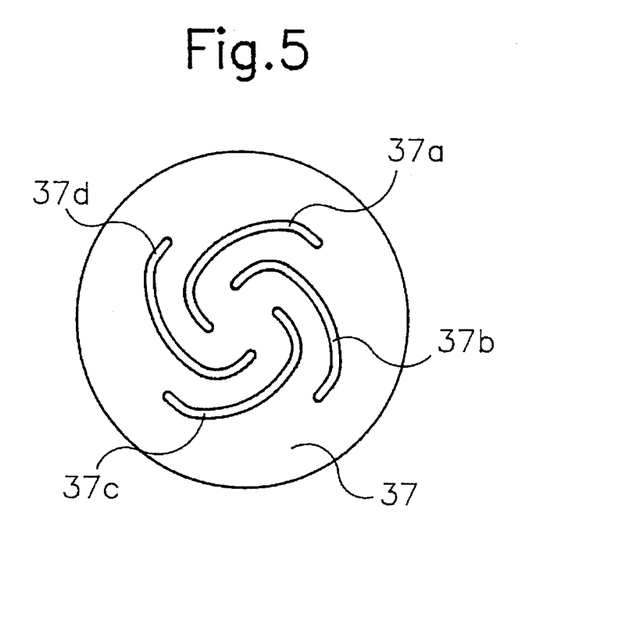
FIG. 5 is a plan view depicting a part of the embodiment of FIG. 4.

In order that a great force will not be exerted on the secured portion of movable member 37, near the outer diameter portion thereof, when this member is deflected, it is formed to have a plurality of slits 37a, 37b, 37c, and 37d in the form of a spiral, as shown in FIG. 5, or is formed by press molding concentric wave forms.

Nozzle 35 is connected through a conduit 38, to a restrictor 39 to which a supply air pressure $P_s$ is externally supplied, and a nozzle back pressure generated by restrictor 39 is removed through conduit 40. Housing 32 is formed with an outlet 41 in communication with the outside.

Lower housing 33 has an outer diameter portion in the shape of a cylinder which is integrally secured to the outer diameter portion of housing 32. A cylindrical pole piece 42, made of a soft magnetic material, is secured at the center, with a predetermined gap length $L_{g2}'$, to movable member 37. A coil 43, through which a current signal I flows, is wound about pole piece 42.

Figure 6:
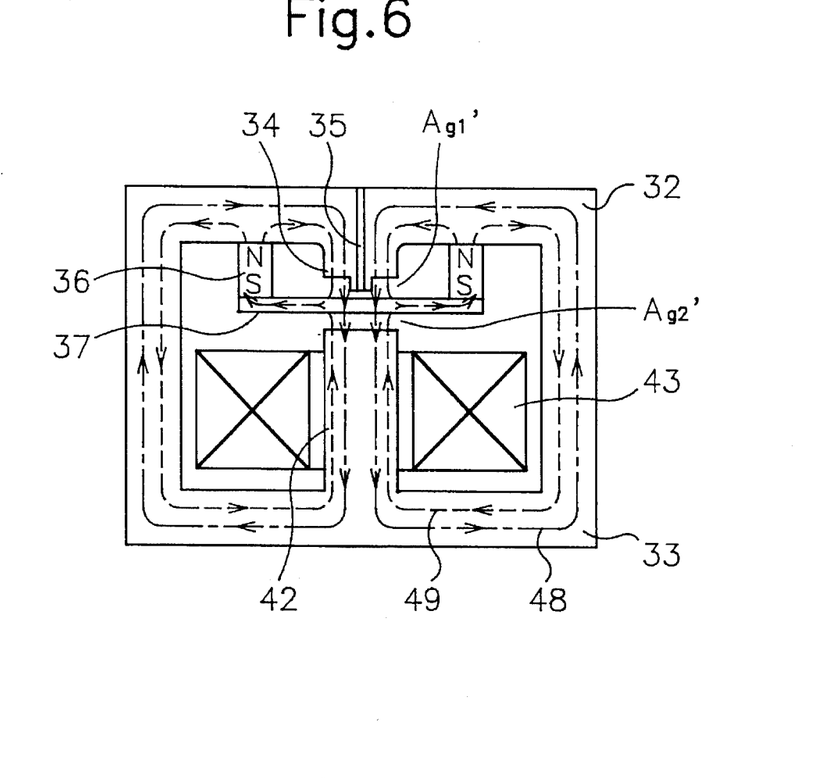
FIG. 6 is a view useful in describing the operation of the embodiment of FIG. 4.

The operation of the embodiment of FIG. 4 will now be described with reference to FIGS. 6–8. In FIG. 6, magnetic flux $\phi_E$, generated by coil 4, flows through upper and lower housings 32, and 34 and pole pieces 34 and 42 along paths indicated by dashed lines 48. Specifically, the magnetic flux which has exited pole piece 34 flows through an air gap $A_{g1}'$, movable member 37 in the direction of the thickness thereof, and then an air gap $A_{g2}'$, pole piece 42, housing 33 and 32, and pole piece 34. Thus, magnetic flux $\phi_E$ is formed in both air gaps $A_{g1}'$ and $A_{g2}'$ in the same direction (i.e. in an upward direction). This is because movable member 37 is substantially saturated in the horizontal direction in parallel with the surface thereof because it is magnetized by permanent magnet 36 and is made sufficiently thin (e.g. about 0.05 to 0.5 mm) so that it can be easily deflected up and down and because movable member 37 is connected to housing 32 through permanent magnet 36 and the horizontal length thereof is sufficiently larger than the air gaps $A_{g1}'$, and $A_{g2}'$.

Figure 7:
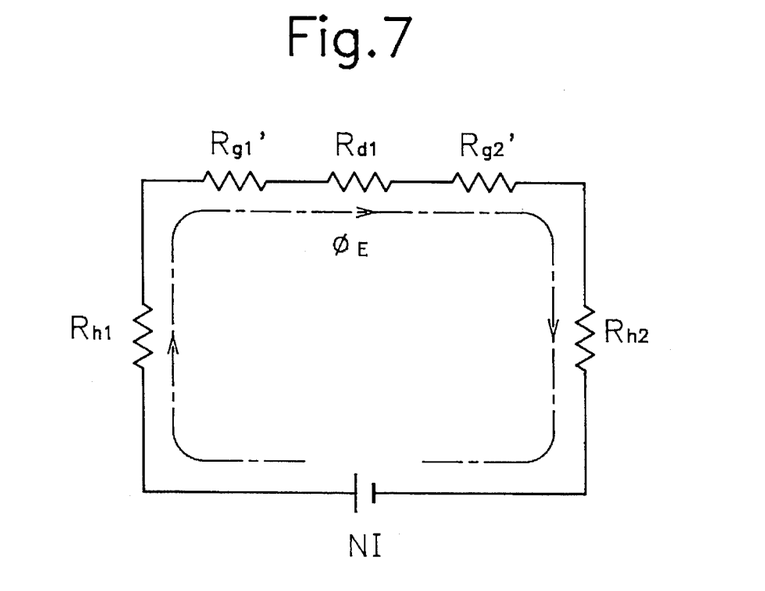
FIG. 7 is an equivalent magnetic circuit diagram useful for describing the operation of the embodiment of FIG. 4.

FIG. 7 shows a magnetic flux diagram of magnetic flux $\phi_E$ generated by coil 43, wherein N designates the number of turns of coil 43; I designates an input current; $R_{g1}'$, designates the magnetic resistance of air gap $A_{g1}'$; $R_{g2}'$ designates the magnetic resistance of air gap $A_{g2}'$; $R_{d1}$ designates the magnetic resistance in the direction of the thickness of movable member 37; and $R_{h1}$ and $R_{h2}$ designate the magnetic resistance of housings 32 and 33, respectively.

Magnetic flux $\phi_E$ is given by the following equation:

$$\phi_E = NI/(R_{g1}' + R_{g2}' + R_{d1} + R_{h1} + R_{h2}) \tag{6}$$

Consider that $R_g' = R_{g1}' = R_{g2}'$; and $R_h = R_{h1} = R_{h2}$; the relative magnetic permeability of movable member 37 and housings 32 and 33 is on the order of $10^3$ to $10^4$; and $R_g' \gg R_{d1}$ and $R_g' \gg R_h$ because magnetic flux $\phi_E$ flows through movable member 37 in the direction of the thickness thereof. Then, magnetic flux $\phi_E$ is given as follows:

$$\phi_E = NI/2R_g' \tag{7}$$

Therefore, magnetic flux $\phi_E$ is substantially dominated by the resistance of the air gaps and is substantially free from the influence of the non-linearity and hysteresis of the soft magnetic material used in member 37. Thus, it is proportional to input current I.

If permanent magnet 36 is disposed so that the surface thereof, in contact with housing 32, serves as the N-pole, and the surface thereof, in contact with the movable member 37, serves as the S-pole, as shown in FIG. 6, then magnetic flux $\phi_E$, generated by permanent magnet 36, flows through housings 32 and 33, pole pieces 34 and 42, and movable member 37, along the path indicated by broken line 49.

Specifically, the flowing directions of magnetic flux $\phi_E$ through air gaps $A_{g1}'$ and $A_{g2}'$ are opposite to each other, i.e. it flows downwardly through air gap $A_{g1}'$, and flows upwardly through air gap $A_{g2}'$. In the paths for the magnetic flux up to air gaps $A_{g1}'$ and $A_{g2}'$, the lengths of the magnetic paths are different between housings 32 and 33 and between pole pieces 34 and 42. However, since the magnetic resistance is substantially determined by the air gaps and movable member 37 for both of these paths, magnetic flux $\phi_d$ flows through the air gaps with the same magnitude but in opposite directions.

Figure 8:
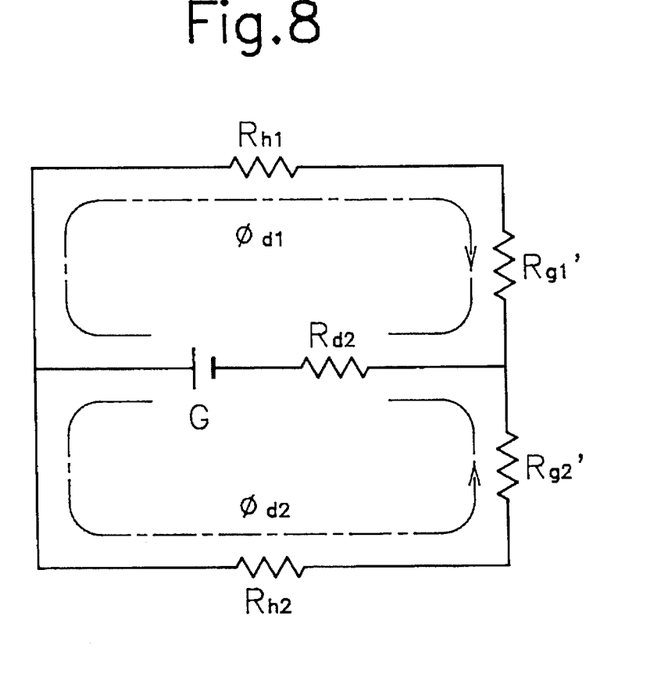
FIG. 8 is another equivalent magnetic circuit diagram useful for describing the operation of the embodiment of FIG. 4.

A magnetic circuit diagram equivalent to magnetic flux $\phi_d$ generated by permanent magnet 36 is shown in FIG. 8 wherein G designates a magnetomotive force produced by permanent magnet 36 and $R_{d2}$ designates magnetic resistance in a direction parallel to the surface of movable member 37. Magnetic flux $\phi_{d1}$ and $\phi_{d2}$, flowing through the air gaps, are given by the following equations:

$$\phi_{d1} = G(R_{g2}' + R_{h2})/[R_{d2}(R_{g1}' + R_{h1}) + R_{d2}(R_{g2}' R_{h2}) + (R_{g1}' + R_{h1})(R_{g2}' + R_{h2})] \tag{8}$$

$$\phi_{d2} = G(R_{g1}' + R_{h1})/[R_{d2}(R_{g1}' + R_{h1}) + R_{d2}(R_{g2}' R_{h2}) + (R_{g1}' + R_{h1})(R_{g2}' + R_{h2})] \tag{9}$$

The following equation (10) can be derived from equations (8) and (9) by dividing the numerators and denominators on the right side of equations (8) and (9) by $R_{g2}'$, on the assumption that $R_g' = R_{g1}' = R_{g2}'$; $R_{h1}/R_g' \ll 1$; and $R_{h2}/R_g' \ll 1$.

$$\phi_{d1} = \phi_{d2} = \phi_d = G/(2R_{d2} + R_g') \tag{10}$$

Therefore, magnetic flux $\phi_d$ flows through air gaps $A_{g1}'$ and $A_{g2}'$ above and under movable member 37 in opposite directions with substantially constant magnitude.

It is apparent from the above discussion that summative magnetic flux ($\phi_E$ and $\phi_d$) and differential magnetic flux ($\phi_E - \phi_d$) flow through air gaps $A_{g1}'$ and $A_{g2}'$ above and under movable member 37, respectively.

Since a force F, produced between magnetic elements, is proportional to the square of the magnetic flux, an upward force is exerted on movable member 37.

$$F \propto (\phi_E - \phi_d)^2 - (\phi_E + \phi_d)^2 = K_M \cdot \phi_E \cdot \phi_d \tag{11}$$

Movable member 37 is deflected in an up and down direction in proportion to the upward and downward forces that it receives. It has a spring constant K in the up and down direction. Thus, displacement δ, as given by the following equation (12), occurs when a force F is exerted on it.

$$\delta = F/K = K_M \cdot \phi_E \cdot \phi_d / K \tag{12}$$

In equation (12), $K_M$ and K are constants. Magnetic flux $\phi_d$ of permanent magnet 36 is substantially constant because displacement δ is sufficiently small relative to the lengths of air gaps $A_{g1}'$ and $A_{g2}'$. Since magnetic flux $\phi_E$, generated by coil 43, is proportional to input current I, displacement δ, i.e. the gap between nozzle 35 and movable member 37, is proportional to input current I. As a result, nozzle back pressure $P_o$, which is the output pressure, is proportional to input current I.

Thus, magnetic flux $\phi_E$, generated by coil 43, flows through movable member 37 only in the direction of the thickness thereof in the FIG. 4 embodiment. This makes in possible to significantly reduce the mass of movable member 37 which is a movable portion. In addition, since movable member 37 itself can be deformed by a magnetic force, there is no need for an added weight to maintain balance.

Since, movable member 37 is secured at a small number of securing points, it can be simply and reliably secured. Also, it is easy to entirely cover, with a soft magnetic material, the areas where the magnetic forces are generated. This makes it possible to provide an electricity/air pressure converter which is compact in size, inexpensive to manufacture, and highly stable and reliable.

Such a converter is significantly advantageous when used in an electropneumatic positioner, wherein a feedback signal is negatively fed back by converting it into an electrical signal, as shown in FIG. 3, or used as the converting element in an electricity to air pressure converter device.

Although housings 32 and 33 described in FIG. 4 have a cylindrical outer diameter portion, the invention is not limited thereto, and any other configuration, such as a rectangular shape, may be used as long as a space can be defined therein. Also, it is not necessary to make the housings 32, 33 of a magnetic material so as to completely separate the inside and outside thereof. The housings may be partially of a non-magnetic material and may include gaps so long as portions thereof made of a soft magnetic material are connected in an area equal to or larger than a predetermined value.

Although nozzle 35 has been shown to be separate from housing 32, the invention is not limited thereto. The nozzle may be an integral part of the housing. Furthermore, nozzle 35 need not be provided on pole piece 34, as depicted; rather, it can also be provided on pole 42 instead.

Although outlet 41 is provided on housing 32, as depicted, it may instead be provided on housing 33 or the area where housings 32 and 33 are joined.

Permanent magnet 36 has been described as being of donut shape. However the invention is not limited to such shape; rather, the permanent magnet may have a configuration wherein a plurality of permanent magnets, which are magnetized in an up-down direction, may be arranged in the shape of a circle.

Figure 9:
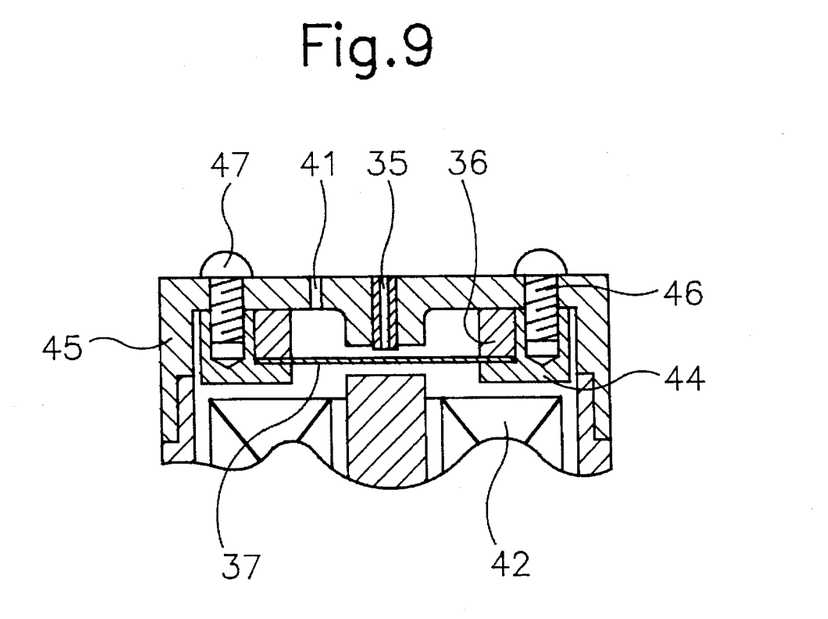
FIG. 9 is a longitudinal sectional view depicting a second illustrative embodiment of the invention and encompassing a modification of the embodiment of FIG. 4.

FIG. 9 shows a modification of the securing structure on the movable member, wherein the movable member 37 is secured by the attracting force of permanent magnet 36. In FIG. 9, the outer diameter portion of movable member 37 is held by a circular securing member 44, made of a non-magnetic material, and is secured by bolts 46 and 47, from the outside of the housing 45.

Figure 10:
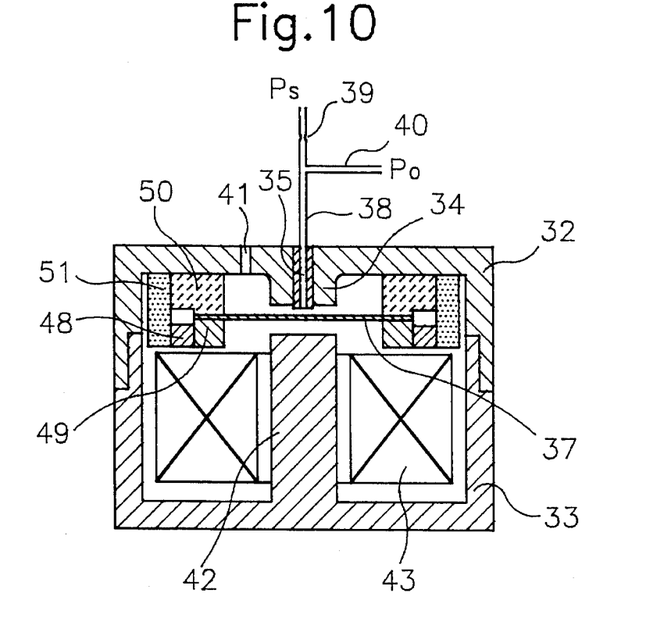
FIG. 10 is a longitudinal sectional view depicting a third illustrative embodiment of the invention and encompassing a modification of the embodiment of FIG. 4.

FIG. 10 shows another modification of the FIG. 4 embodiment, wherein parts having identical functions to those in FIG. 4 are designated by the same reference numerals, and description thereof is omitted hereat for sake of clarity of description. The FIG. 10 embodiment differs from the FIG. 4 embodiment in that a circular magnet 48 is magnetized in the radial direction (shows as the horizontal direction in the drawing) instead of the vertical direction. Movable member 37 is mounted on a circular member 49, made of a soft magnetic material, which is secured to an inner surface of the upper portion of housing 32, through a circular member 50, made of a non-magnetic material, such as austenited stainless steel, copper alloy, and aluminum alloy.

A member 50, made of a soft magnetic material, is mounted on the outer side surface of permanent magnet 48, and an end face of of member 51 is secured to upper housing 32 so that the magnetic flux generated by permanent magnet 48 flows through housings 32, 33.

The embodiment also provides magnetic flux which flows through the upper and lower air gaps in opposite directions with a substantially constant magnitude, thereby resulting in the same advantages as those obtained with the embodiment of FIG. 4.

Furthermore, the FIG. 10 embodiment allows movable member 37 to be disposed between metal components. This is advantageous in that the movable member can be more reliably secured, and also, in that high precision processing is not required on the permanent magnet 48 which is slightly more difficult to process as compared to metal components.

Figure 11:
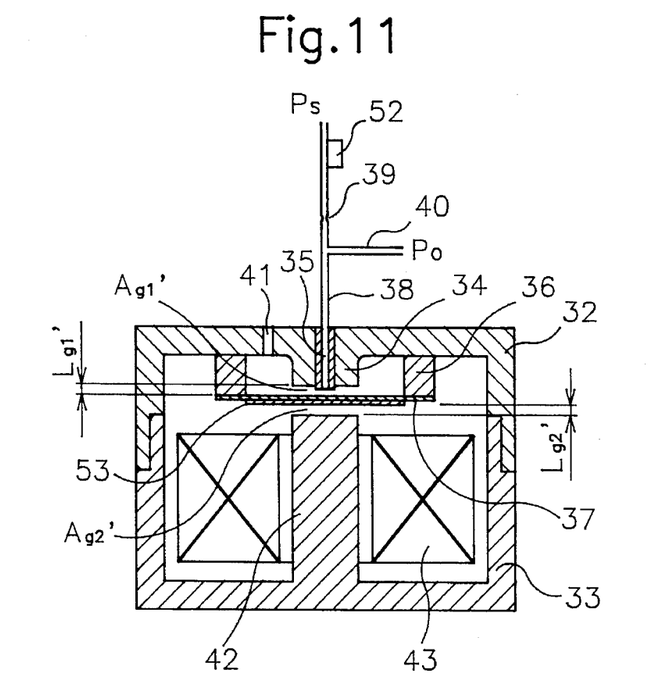
FIG. 11 is a longitudinal sectional view depicting a fourth illustrative embodiment of the invention and encompassing a modification of the embodiment of FIG. 4.

FIG. 11 shows another partial modification of the embodiment of FIG. 4, wherein a magnet 52 is secured to the conduit externally communicating with restrictor 39 and an elastic film 53 is provided on movable member 37. Magnet 52 serves to prevent any magnetic material, included in supply air pressure $P_s$ externally supplied to the device, from entering nozzle 35, and to prevent movable member 37 from acting as a flapper. Elastic film 53 is formed, for example, of a rubber sheet, and is disposed to be in contact with movable member 37 to prevent self-excited vibration of member 37 by the air blown out from nozzle 35.

Generally speaking, the air blown out of nozzle 35 includes an unsteady flow of vibration components in a wide range of frequencies, because the air undergoes a transition from steep contraction to steep expansion in the flow path. Such vibration components can exert a force on movable member 37 to cause vibration near the resonance point thereof. The movable member 37 has spring properties so that vibration is possible.

Such a vibration can fatigue member 37 and cause deterioration of the properties thereof due to the positional shifts in the securing points. Thus, damping is performed by film 53 to prevent deleterious vibrations, thereby stabilizing the device. The film may also be made of silicon.

Figure 12:
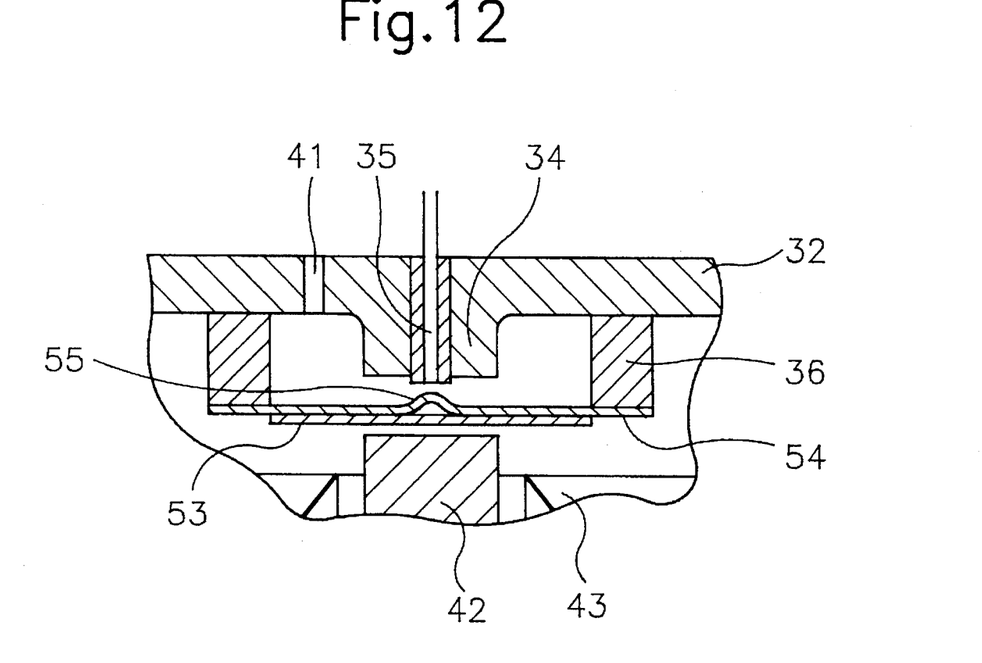
FIG. 12 is a partial sectional view depicting a fifth illustrative embodiment of the invention and encompassing a modification of the embodiment of FIG. 11.

FIG. 12 shows an alternative arrangement for preventing vibration to that shown in FIG. 11, for example, wherein a convex portion 55, in the shape of a sphere or circular cone, is provided on movable member 54 facing nozzle 35, to prevent air blown out of nozzle 35 from causing self-excited vibrations of member 54. With the FIG. 12 embodiment, the air blown out of nozzle 35, after being subjected to abrupt contraction therein, is gradually expanded by convex portion 55. This causes reduction of vibration energy of the air flow out from nozzle 35, and dampens the vibration, and thus, enables attainment of stability.

Figure 13:
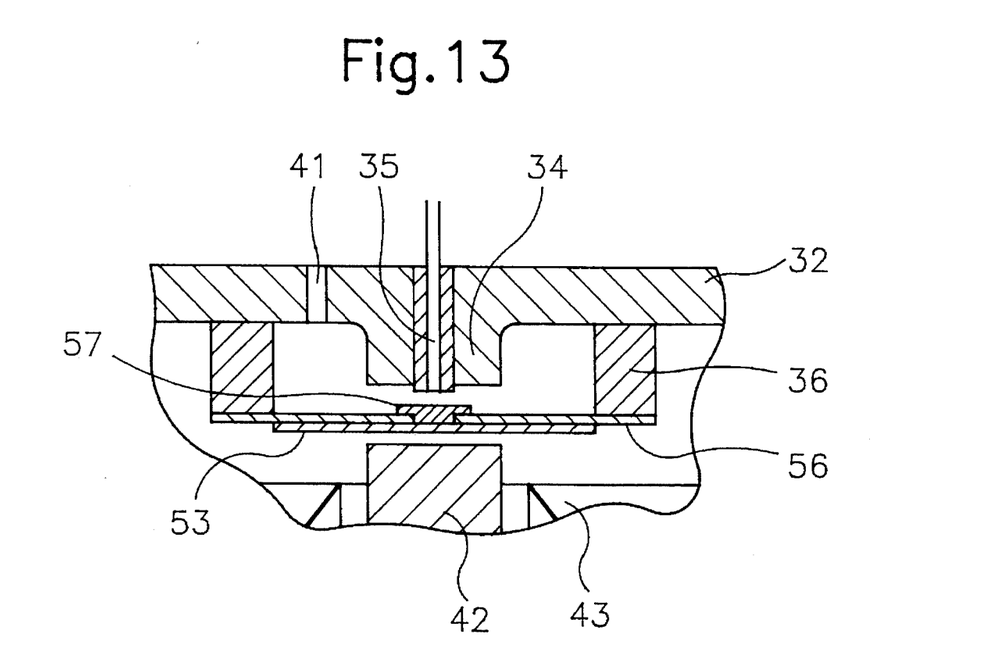
FIG. 13 is a partial sectional view depicting a sixth illustrative embodiment of the invention and encompassing a modification of the embodiment of FIG. 11.

FIG. 13 shows an arrangement for preventing absorption of magnetic powder entering the device from the outside, wherein a disc shaped non-magnetic member 57 is secured to the portion of a movable member 56 facing nozzle 35. The non-magnetic member 57 prevents magnetic powder, entering from the outside, from being absorbed or attracted and held by movable member 56, which is made of a magnetic material. In the embodiment, the non-magnetic member 57 is preferably made of a material of low specific gravity, such as aluminum and titanium, in order to not decrease the resonant frequency.

The invention attains various advantages, such as those listed hereinbelow.

(1.) Since the magnetic flux generated by the coil flows through the movable member only in the direction of the thickness thereof, the thickness of the movable member can be reduced. This makes it possible to reduce the mass of the member, and consequently, to provide a stable electricity to air pressure converter which excels in anti-vibration, anti-shock and control properties.

(2.) The magnetic circuit, through which the magnetic flux generated by the coil and the magnetic flux generated by the permanent magnet flow, is closed. Also, the air gaps generating a force are covered by a magnetic material. This eliminates the need for a magnetic shield member for shielding the components from the outside influences and makes it possible to provide an electricity to air pressure converter which is also stable against external magnetic disturbances while advantageously being compact in size and of low cost.

(3.) The movable member is secured at only one point on the circumferential surface thereof. Even if a positional shift, associated with thermal expansion coefficient, occurs on the securing surface, since the direction of the securing surface is perpendicular to the direction of the gap in the nozzle, the influence of such a positional shift is minimized. Thus, it is possible to provide an electricity to air pressure converter which is stable with respect to temperature changes, and the like.

(4.) Although there is a possibility that the housings, pole pieces, and movable member will shift in the horizontal direction relative to the axis of assembly, their positions in the vertical direction, which significantly affect the characteristics of the device, can be determined according to the accuracy attained during production of the components. This simplifies the assembly process, and reduces the time required for assembly, and hence, substantially reduces the cost of the device.

(5.) Since the mass of the movable member can be significantly reduced, it is possible to raise the resonance point to a frequency in the range of 500 Hz to 1500 Hz, which scarcely occurs in the environment wherein the electricity to air pressure converter is usually used.

(6.) Since the movable member is displaced linearly in the up-down direction instead of being rotated, there is no need to use an added weight for balancing the member. At the same time, the member can be made compact and small because of such functional property. Thus, the entire device can be advantageously made to be compact.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An electricity/air pressure converter comprising a pair of housings, made of a soft magnetic material, and in the middle of which two pole pieces are disposed to face each other with an air gap therebetween and having a cylindrical outer circumferential portion;

a permanent magnet secured to one of said pair of housings at one end thereof and surrounding one of said two pole pieces;

a movable member, made of a magnetic material, and having spring properties, and which is secured to the other end of said permanent magnet, and which is disposed between said two pole pieces to face said two pole pieces in said air gap;

a coil wound around the other of said two pole pieces and through which a current signal flows; and a nozzle disposed through said one of said two pole pieces to face said movable member at a location about at a center thereof and supplied with an air pressure so that a nozzle back pressure is generated at said nozzle according to said current signal and an air pressure signal is outputted which is related to said current signal.

2. The converter of claim 1, wherein said movable member is a plate shaped member having a plurality of spiral slits formed therein.

3. The converter of claim 1, wherein said permanent magnet is formed of a hard magnetic material having a large energy product.

4. The converter of claim 1, wherein said permanent magnet is magnetized in a axial direction of said two pole pieces.

5. The converter of claim 1, wherein said permanent magnet is magnetized and secured in a direction perpendicular to the axial direction of said two pole pieces.

6. The converter of claim 1, wherein an outlet in communication with the outside of said converter is provided on at least one of said pair of housings.

7. The converter of claim 1, wherein a magnet is provided in a conduit through which said supply air pressure is supplied.

8. The converter of claim 1, wherein an elastic film is provided on said movable member.

9. The converter of claim 1, wherein a convex portion is provided on said movable member facing said nozzle.

10. The converter of claim 9, wherein said convex portion is in the shape of a sphere.

11. The converter of claim 1, wherein a non-magnetic member is provided on said movable member facing said nozzle.

* * * * *